Feb. 4, 1964 K. D. BALL 3,120,236
CLEANING DEVICE FOR MEAT CHOPPER PLATES
Filed March 29, 1962 3 Sheets-Sheet 1
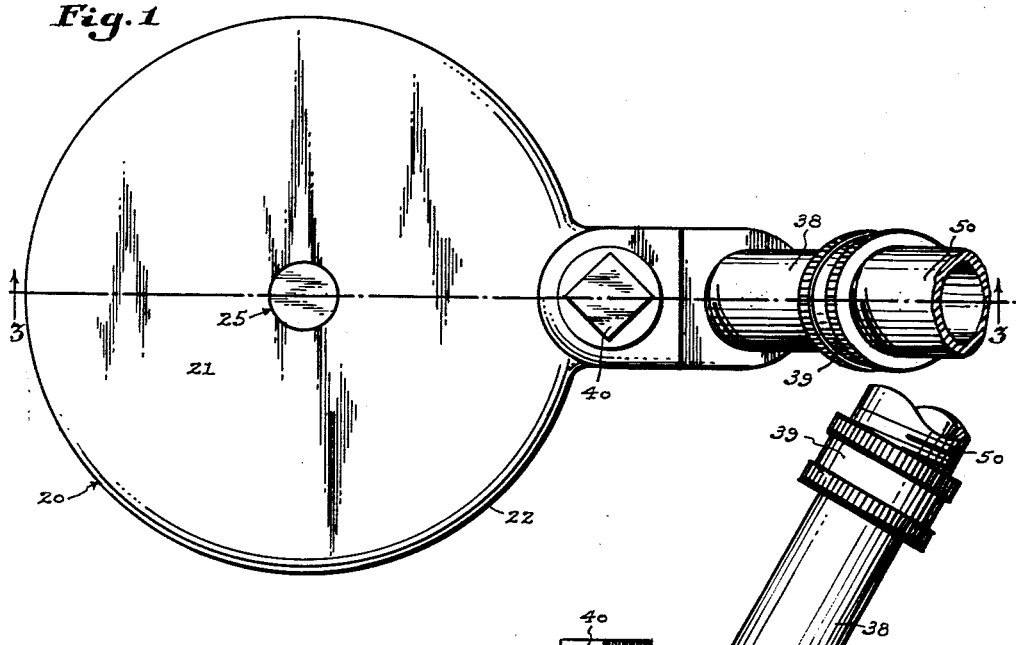
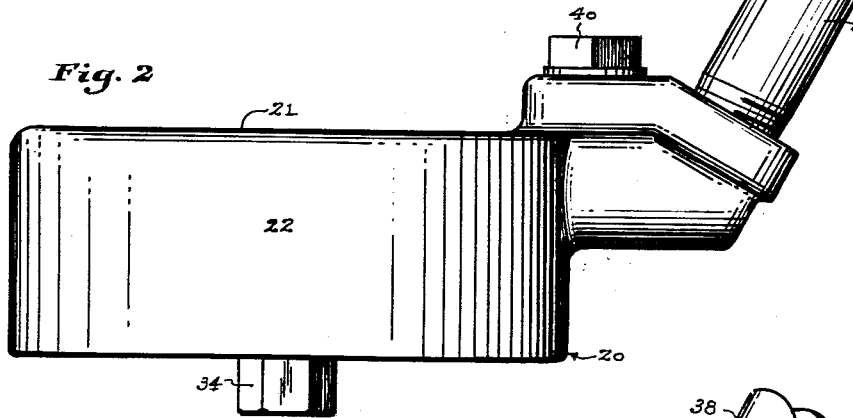
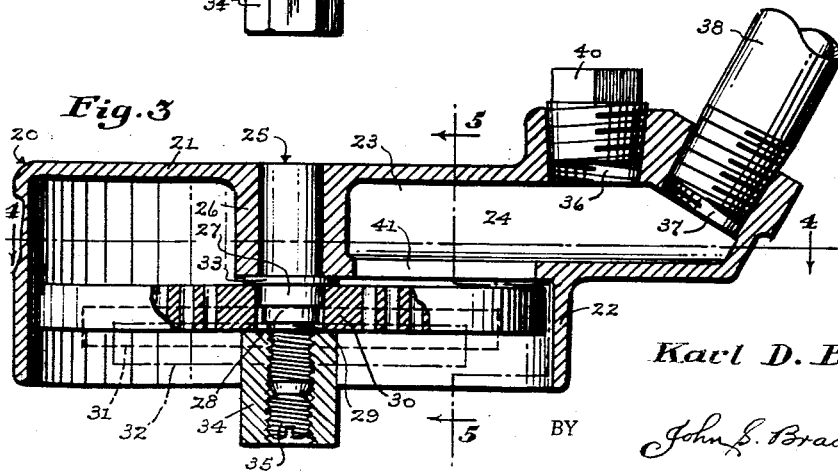
INVENTOR
*Karl D. Ball*
BY *John E. Braddock*
ATTORNEY Feb. 4, 1964 K. D. BALL 3,120,236
CLEANING DEVICE FOR MEAT CHOPPER PLATES
Filed March 29, 1962 3 Sheets-Sheet 2
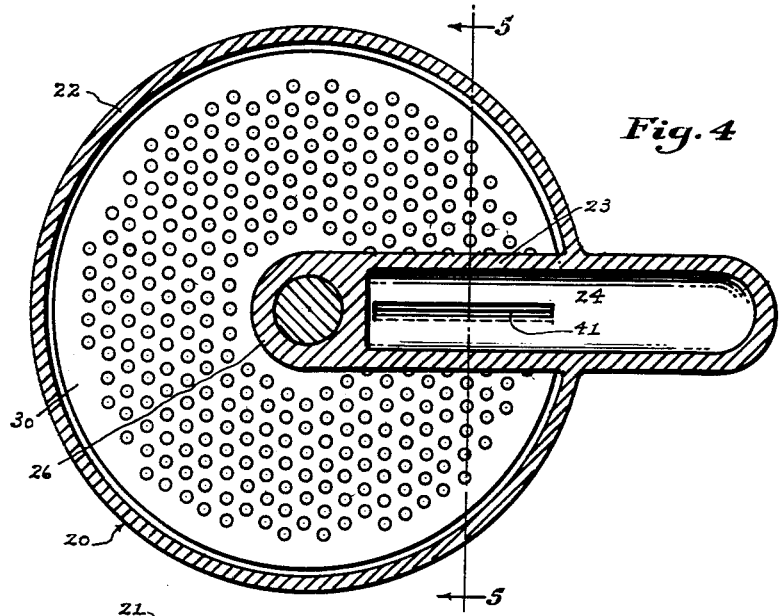
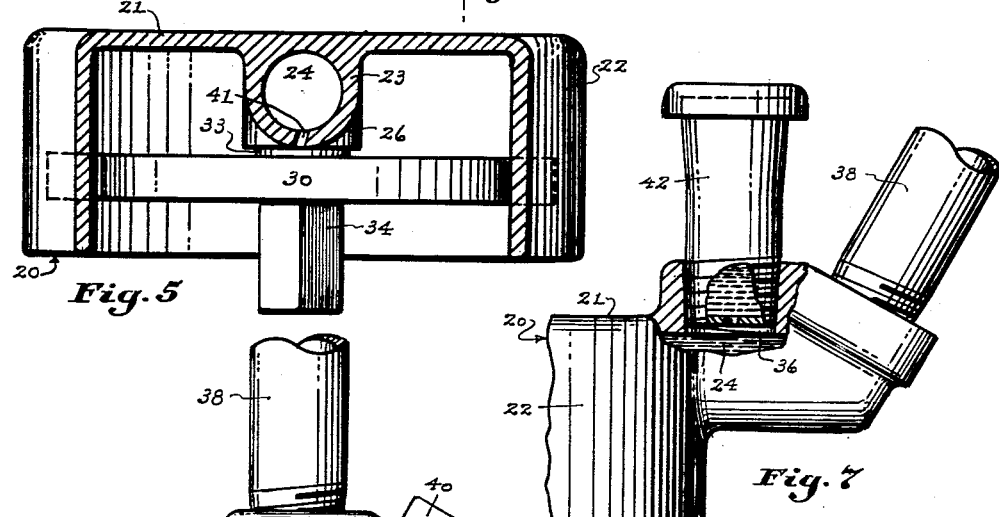
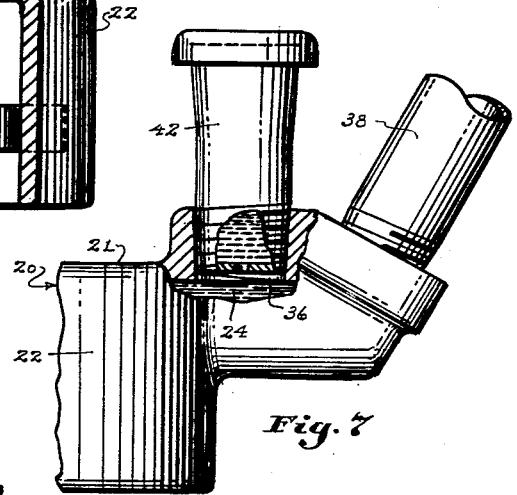
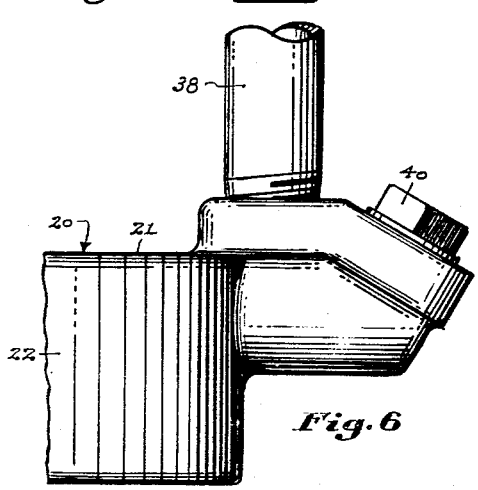
INVENTOR
Karl D. Ball
BY John S. Braddock
ATTORNEY Feb. 4, 1964 K. D. BALL 3,120,236
CLEANING DEVICE FOR MEAT CHOPPER PLATES
Filed March 29, 1962 3 Sheets-Sheet 3
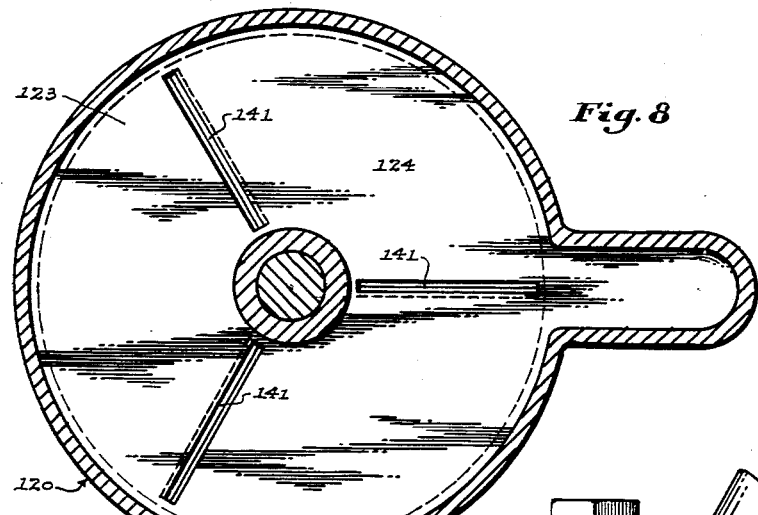
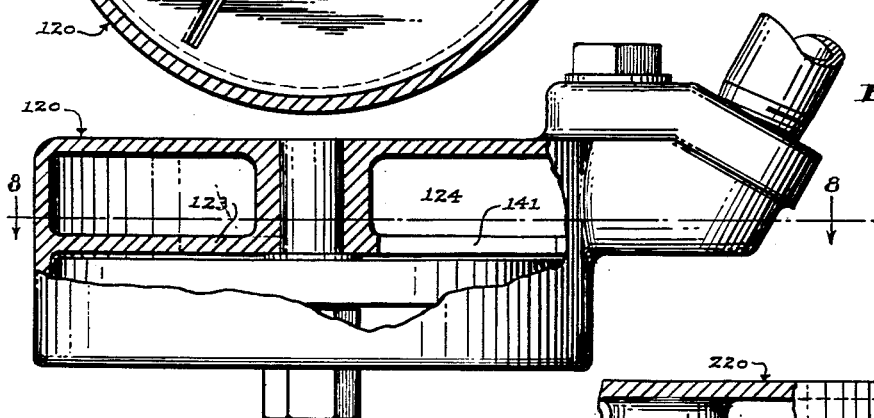
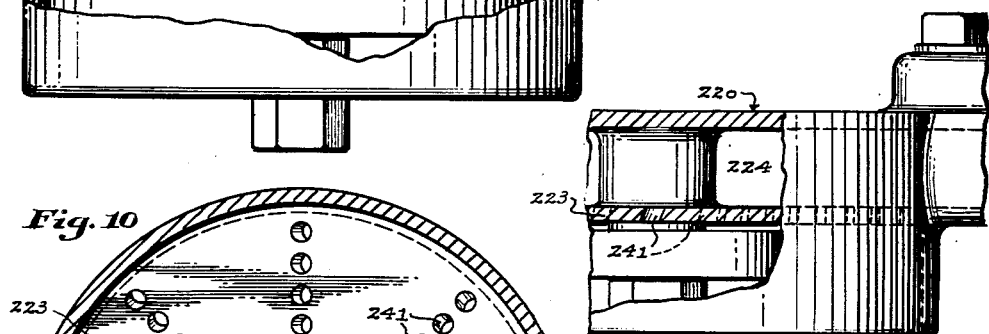
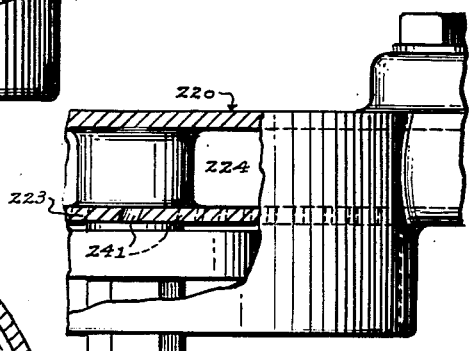
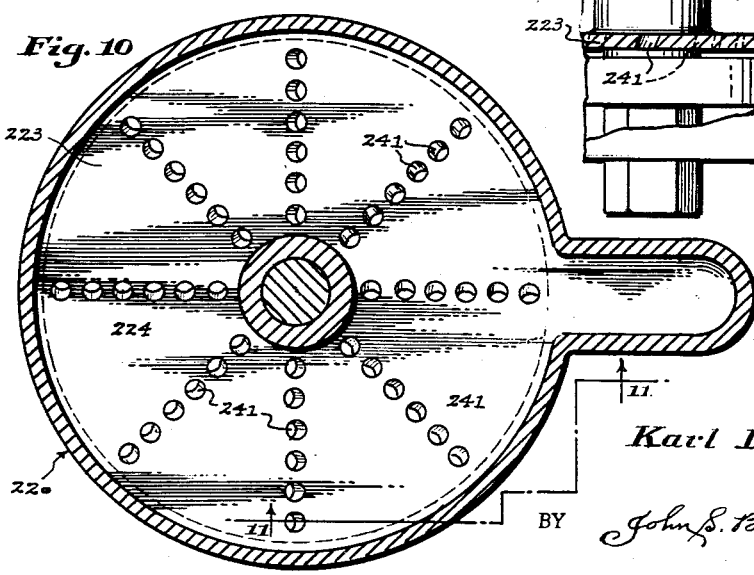
INVENTOR
Karl D. Ball
BY John S. Braddock
ATTORNEY

United States Patent Office 3,120,236
Patented Feb. 4, 1964

3,120,236
CLEANING DEVICE FOR MEAT CHOPPER
PLATES
Karl D. Ball, 18309 Fruitport Road, Spring Lake, Mich.
Filed Mar. 29, 1962, Ser. No. 183,610
5 Claims. (Cl. 134—100)

The present invention relates to a cleaning device for meat chopper plates or the like having a multiplicity of apertures therethrough.

The circular meat chopper plates in common use in meat markets are made of relatively thick steel on the order of about 5/16-inch to 3/8-inch thick, and they have very flat, parallel side surfaces and small cylindrical apertures therethrough normal to the side surfaces. These plates are difficult to clean because of the lengths and the small diameters of the apertures therethrough. Such plates come in several different sizes and also have several different diameters of central mounting bores therethrough.

The primary objects of the invention are, therefore, to provide a meat chopper plate cleaning device which utilizes pressurized fluid for flushing matter out of the plates' apertures and in such a manner as also to rotate the plate during the flushing process so that all of the apertures are flushed; to provide such a device which can be attached to a water faucet and left unattended while the flowing water both rotates the chopper plate and flushes out all of the apertures; to provide such a plate cleaning device which will accommodate the several different varieties of meat chopper plates in common use; and in general to provide such a cleaning device which is convenient and efficient in use and reasonably economical in manufacture.

Illustrative embodiments of the invention are shown in the accompanying drawings, wherein:

FIGURE 1 is a top plan view of the new plate cleaning device shown attached to a water faucet, the latter being shown fragmentarily;

FIGURE 2 is a side elevational view of the same;

FIGURE 3 is a central vertical sectional view of the same taken on line 3—3 of FIGURE 1;

FIGURE 4 is a horizontal sectional view of the device taken on line 4—4 of FIGURE 3;

FIGURE 5 is a vertical sectional view of the same taken on lines 5—5 of FIGURES 3 and 4;

FIGURE 6 is a fragmentary side elevational view of the device, here shown attached to a vertically depending water faucet as contrasted with the forwardly-downwardly sloping water faucet indicated in FIGURES 2 and 3;

FIGURE 7 is a fragmentary side elevational view of the device showing a soap dispenser associated therewith;

FIGURE 8 is a horizontal sectional view, similar to FIGURE 4, and showing a modified form of the plate cleaning device, the plane of section being indicated by the line 8—8 of FIGURE 9;

FIGURE 9 is a view partly in side elevation and partly in central vertical section of the modification shown in FIGURE 8;

FIGURE 10 is a horizontal sectional view, similar to FIGURE 8, and showing a further modified form of the device; and FIGURE 11 is a fragmentary view partly in side elevation and partly in vertical section taken on line 11—11 of FIGURE 10, of the modification shown in FIGURE 10.

Referring now in detail to these drawings, the meat chopper plate cleaning device shown in FIGURES 1 through 5 comprises a casing generally designated 20 which is desirably of cast metal. The casing has a circular top wall 21, an annular side wall 22 depending from the periphery of the top wall 21, an open bottom, and an internal chamber wall 23 which provides a chamber 24 shown in FIGURES 1-5 of tubular form in the upper part of the casing 20.

A spindle generally designated 25 is mounted in a boss 26 depending from the center of the casing's top wall 21, said spindle 25 depending from the top wall to a point well below the chamber wall 23. Below the chamber wall 23, the spindle 25 is provided with a series of pivots 27, 28 and 29 which are of downwardly, progressively reduced diameters for the rotatable mounting thereon of circular, apertured meat chopper plates having central mounting bores of different diameters. Such a plate is shown in full lines in FIGURES 3, 4 and 5 and is designated 30, being mounted on the uppermost, largest pivot 27 as seen in FIGURE 3. Smaller plates 31, 32, having smaller central mounting bores, are indicated by dotted lines and broken lines, respectively, in FIGURE 3. A washer 33 is desirably interposed between the plate 30 and the lower end of the boss 26.

Any of these several varieties of chopper plates can be rotatably mounted on the spindle 25 by means of a nut 34 which is threaded onto the lower end portion of the spindle 25. An adjustment screw 35 is threaded into the lower end of the nut 34 for limiting upward turning of the nut onto the spindle 25. This screw 35 may be adjusted to provide sufficient clearance between the particular chopper plate to be cleaned and the adjacent parts of the cleaning device so that the chopper plate is freely rotatable on the spindle.

A pair of threaded, pressurized fluid inlets is provided in the casing 20 for admitting fluid under pressure into the chamber 24. One of these inlets has a vertical axis and is designated 36; the other inlet has an upwardly sloping axis and is designated 37. A short pipe 38 is provided for coupling the device to a water faucet 50, said pipe 38 having a threaded coupling element 39 mounted on its outer end for attachment to the faucet. Most such water faucets slope downwardly and forwardly at a fixed angle, and in such cases the short pipe 38 is threaded into the casing's sloping inlet 37, and a plug 40 may be threaded into the inlet 36 as seen in FIGURES 1–3. In some instances, however, the water faucet depends vertically, in which cases the short pipe 38 is threaded into the vertical inlet 36 and the plug 40 may be threaded into the other inlet 37 as seen in FIGURE 6.

In operation, water under pressure is admitted to the chamber 24 through inlet 36 or inlet 37. The internal chamber wall 23 has an elongated, slanting discharge port 41 therethrough adjacent the rotatably mounted chopper plate. This discharge port 41 directs the fluid under pressure downwardly from chamber 24 to the apertured chopper plate at an angle, so that the pressurized fluid performs the dual function of rotating the plate and flushing matter out of the plate's apertures. It will be seen that once the cleaning operation has commenced, the device may be left unattended, and because of the plate's rotation by the flowing water all of the apertures therein will automatically be flushed out.

As seen in FIGURE 7, instead of the plug 40, the inlet 36 or 37 which is not utilized as a water inlet may be fitted with a soap dispenser 42 for augmenting the cleaning process.

FIGURES 8 and 9 illustrate a modified form of the invention in which the internal chamber wall 123 is of circular form and the chamber 124 is constituted by the entire upper part of the interior of the casing 120. This modification shows three elongated, slanting discharge ports 141 in the chamber wall 123.

FIGURES 10 and 11 show a still further modified form of the invention in which the internal chamber wall 223 is also of circular form and the chamber 224 is also constituted by the entire upper part of the interior of the casing 220. In this modification the internal chamber wall 223 is provided with radially arranged rows of circular, slanting discharge ports 241.

It will thus be seen that the invention provides a meat chopper plate cleaning device which is convenient, efficient and automatic in operation, and while but several specific embodiments of the invention have been herein shown and described it will be understood that numerous details thereof may be altered or omitted without departing from the spirit of the invention as defined by the following claims.

I claim:

1. In a cleaning device for meat chopper plates or the like having a multiplicity of apertures therethrough in which meat becomes solidly compacted: a casing; means mounting an apertured plate in said casing for free rotation therewithin; a chamber in the casing having a wall thereof in immediate proximity to an apertured surface of the plate; means for introducing fluid under pressure into said chamber; said chamber wall having a slanting discharge port therethrough for directing pressurized fluid from the chamber to the apertured surface of the plate at an angle whereby the pressurized fluid performs the dual function of rotating the plate and flushing the solidly compacted matter out of the plate's apertures.

2. A cleaning device according to claim 1 in which the means for introducing fluid under pressure into said chamber comprises a pair of threaded fluid inlets through the side wall of the casing, one of said inlets having a vertical axis and the other of said inlets having an upwardly sloping axis, a short pipe threaded into one of said inlets and having means at its outer end adapting it for connection to a water faucet, and a plug threaded into the other of said inlets.

3. A cleaning device according to claim 1 in which the means for introducing fluid under pressure into said chamber comprises a pair of threaded fluid inlets through the side wall of the casing, one of said inlets having a vertical axis and the other of said inlets having an upwardly sloping axis, a short pipe threaded into one of said inlets and having means at its outer end adapting it for connection to a water faucet, and a soap dispenser threaded into the other of said inlets.

4. In a cleaning device for circular meat chopper plates having a multiplicity of apertures therethrough: a casing having a circular top wall, an annular side wall depending from the periphery of the top wall, an open bottom, and an internal chamber wall forming a chamber in the upper part of the casing; a fluid inlet extending through a wall of the casing into said chamber; means for connecting said fluid inlet to a source of pressurized fluid; a spindle mounted in the center of the casing's circular top wall and depending therefrom below said chamber wall, said spindle having a series of pivots of downwardly progressively reduced diameter below said chamber wall for the rotatable mounting thereon of circular apertured plates having central mounting bores of different diameters; a nut threaded on the lower end portion of said spindle for rotatably securing a circular apertured plate on one or another of said pivots; an adjustment screw threaded into the lower end portion of said nut and adapted to contact the lower extremity of said spindle for limiting the upward turning movement of the nut onto the spindle; said internal chamber wall having a slanting discharge port therethrough for directing pressurized fluid downwardly from the chamber to the apertured plate at an angle whereby the pressurized fluid performs the dual function of rotating the plate and flushing matter out of the plate's apertures.

5. A cleaning device according to claim 4 characterized by having a plurality of slanting discharge ports through said chamber wall for directing pressurized fluid from the chamber to the apertured plate.

References Cited in the file of this patent

UNITED STATES PATENTS

| | | |
|---|---|---|
| 971,658 | Bergstrom | Oct. 4, 1910 |
| 1,264,792 | Hayward | Apr. 30, 1918 |
| 1,525,756 | McKenney | Feb. 10, 1925 |
| 2,708,447 | Longan | May 17, 1955 |
| 2,774,362 | Nordling | Dec. 18, 1956 |